(12) United States Patent
Noguchi

(10) Patent No.: US 6,378,016 B1
(45) Date of Patent: Apr. 23, 2002

(54) AUTOMATIC CONVERSION DEVICE DRIVER OF DEVICE TYPE DATA

(75) Inventor: Seiji Noguchi, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/573,472

(22) Filed: May 17, 2000

Related U.S. Application Data

(63) Continuation of application No. PCT/JP99/05065, filed on Sep. 17, 1999.

(30) Foreign Application Priority Data

Sep. 18, 1998 (JP) ............................................. 10-283266

(51) Int. Cl.$^7$ ............................................... G06F 13/00
(52) U.S. Cl. ............................. 710/104; 710/8; 710/11; 710/105; 710/129
(58) Field of Search ............................. 710/8, 11, 104, 710/105, 129

(56) References Cited

U.S. PATENT DOCUMENTS

| | | | | |
|---|---|---|---|---|
| 5,867,730 A | * | 2/1999 | Leyda | ........................ 710/10 |
| 5,920,709 A | * | 7/1999 | Hartung et al. | .............. 710/129 |
| 6,006,295 A | * | 12/1999 | Jones et al. | .................... 710/62 |
| 6,115,771 A | * | 9/2000 | Born | .......................... 710/129 |
| 6,154,790 A | * | 11/2000 | Pruett et al. | .................. 710/15 |
| 6,189,050 B1 | * | 2/2001 | Sakarda | ...................... 713/323 |

FOREIGN PATENT DOCUMENTS

| | | |
|---|---|---|
| JP | 7-200192 | 8/1995 |
| JP | 8-110883 | 4/1996 |
| JP | 10-198553 | 7/1998 |

OTHER PUBLICATIONS

Japanese search report for PCT/JP99/05065 dated Dec. 21, 1999.

English translation of Form PCT/ISA/210.

* cited by examiner

*Primary Examiner*—Rupal Dharia
(74) *Attorney, Agent, or Firm*—Ratner & Prestia P.C.

(57) ABSTRACT

Without changing the setting of the existing device's own data, the device type data acquired from the ATAPI device 1 and the device type data which can be recognized by the operating system 4 are compared, and when the both device type data are not matched, the device type data acquired from the ATAPI device 1 is converted into the device type data which can be recognized by the operating system 4.

2 Claims, 3 Drawing Sheets

AUTOMATIC CONVERSION DEVICE DRIVER OF DEVICE TYPE DATA

THIS APPLICATION IS A CONTINUATION APPLICATION OF PCT INTERNATIONAL APPLICATION PCT/JP99/05065 filed Sep. 17, 1999.

FIELD OF THE INVENTION

The present invention relates to an automatic conversion device driver of device type data (hereinafter referred to simply as "DT data") for changing the setting automatically, in case an operating system (hereinafter referred to simply as "OS") of a system cannot recognize the DT data of a certain device connected to the system, so that it can be recognized by the OS of the system.

BACKGROUND OF THE INVENTION

Hitherto, if connected to a certain device having fixed DT data which cannot be recognized by the OS of a certain system, the system could not recognize the DT data of the connected device. As a method of recognizing the DT data of the device by the OS of the system, it is known to change the region of storing the DT data of the device so that the DT data may be recognized by the OS of the system. In this method, the device's specific DT data is changed according to the specific DT data that can be recognized by the OS of the system to which the device is connected.

In the conventional DT data converting method, the design is limited in that the device must have DT data conforming to the DT data which can be recognized by the OS of the system to which the device is connected.

Yet, in the device designed to recognize the DT data by other OS, when connected to an OS that cannot recognize this DT data, the OS cannot recognize the DT data of this device.

SUMMARY OF THE INVENTION

The present invention is intended to solve these problems by providing the system with an automatic conversion device driver. In the automatic conversion device driver of the invention, the DT data of the device having the DT data which cannot be recognized by the OS of the system to which it is connected is automatically changed in setting so that it can be recognized by this OS, without changing the setting of the own data of the existing device. It is hence an object of the invention to present an automatic conversion device driver of the DT data.

The means of solving the problems is described below.

The automatic conversion device driver of DT data of the invention acquires the DT data from the device conforming to AT Attachment Packet Interface standard (hereinafter referred to simply as "ATAPI device").

If the DT data of the ATAPI device stored in the DT data storage region of the ATAPI device driver cannot be recognized by the OS of the system to which the ATAPI device is connected, (a) The ATAPI device driver changes the DT data stored in the DT data storage region of the ATAPI device driver, into the DT data which can be recognized by the OS stored in the DT data storage region which can be recognized by the OS of the ATAPI device driver, (b) The ATAPI device driver returns the changed DT data to the OS of the connected system, and (c) Without changing the setting of the existing device's own data, the setting is changed automatically so as to be recognized by the OS of the system which cannot recognize this DT data.

Hence, no particular design is required in the device. As a result, there is no problem when connecting the device to the system.

DESCRIPTION OF THE PREFERRED EMBODIMENTS

Figure 1:
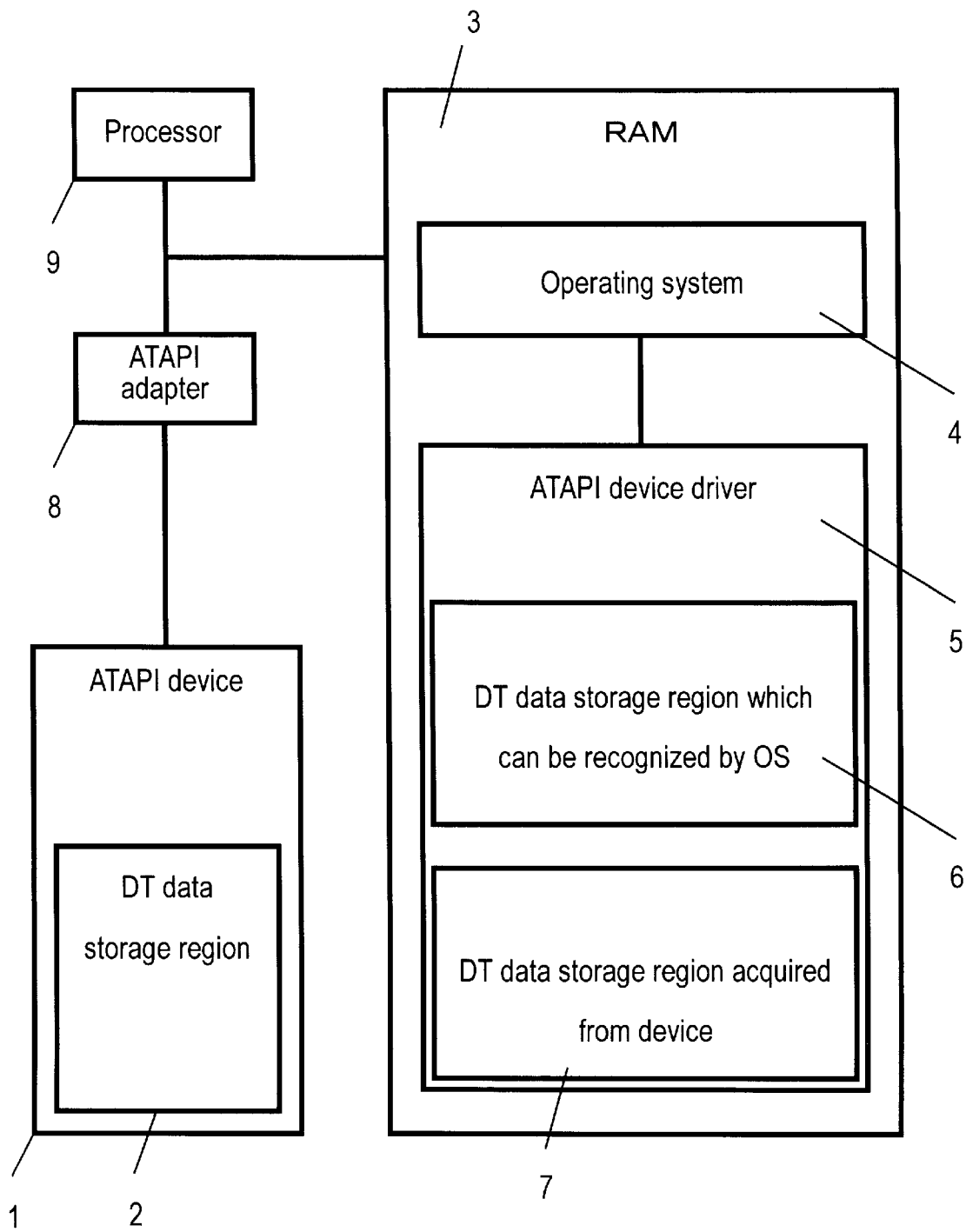
FIG. 1 is a block diagram of an embodiment of an automatic conversion device driver of DT data of the invention.

An embodiment of the invention is described below while referring to the drawings.

Exemplary Embodiment

Figure 2:
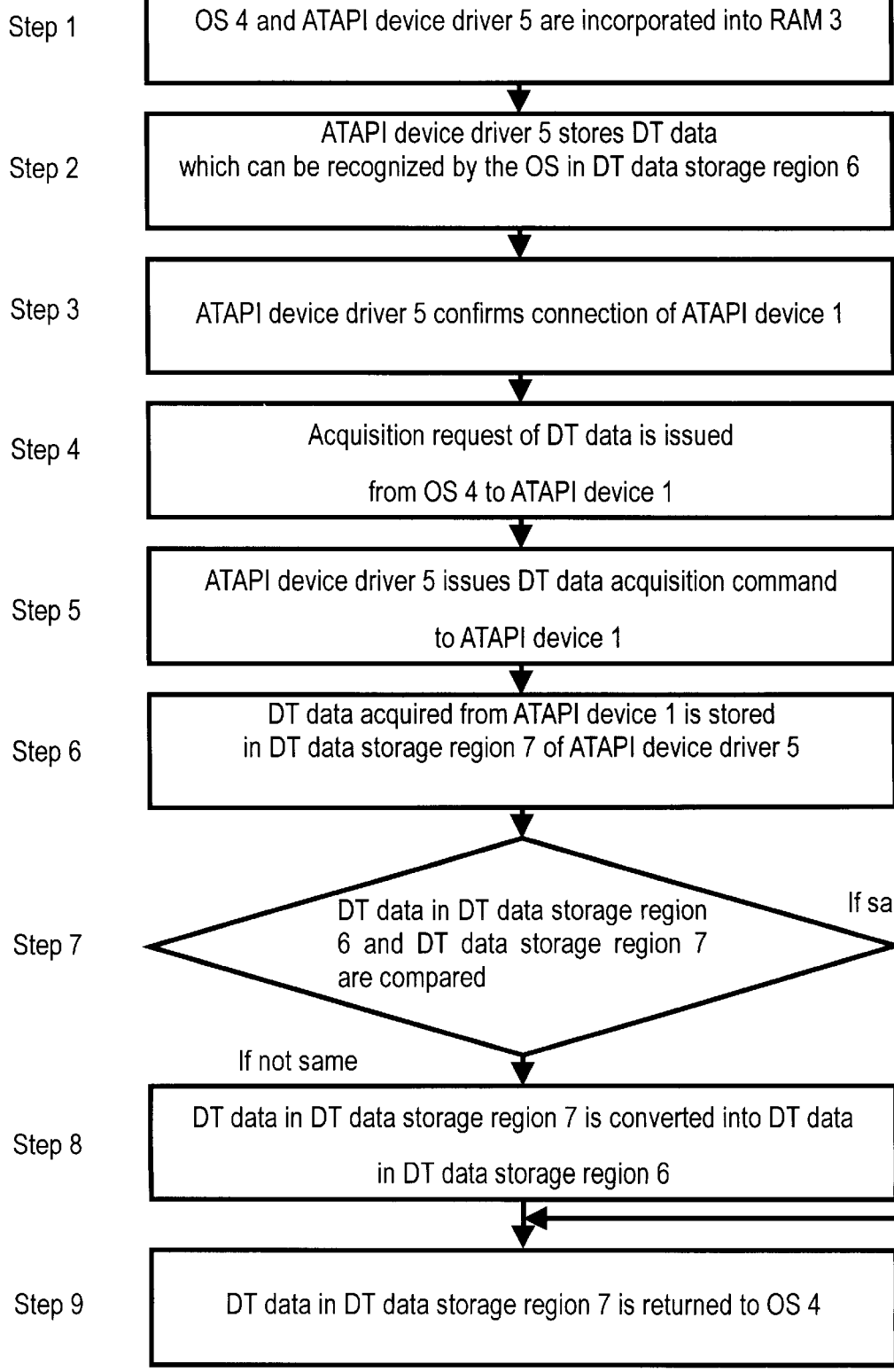
FIG. 2 is a flowchart showing the operation of the automatic conversion device driver of DT data of the invention shown in FIG. 1.
Figure 3:
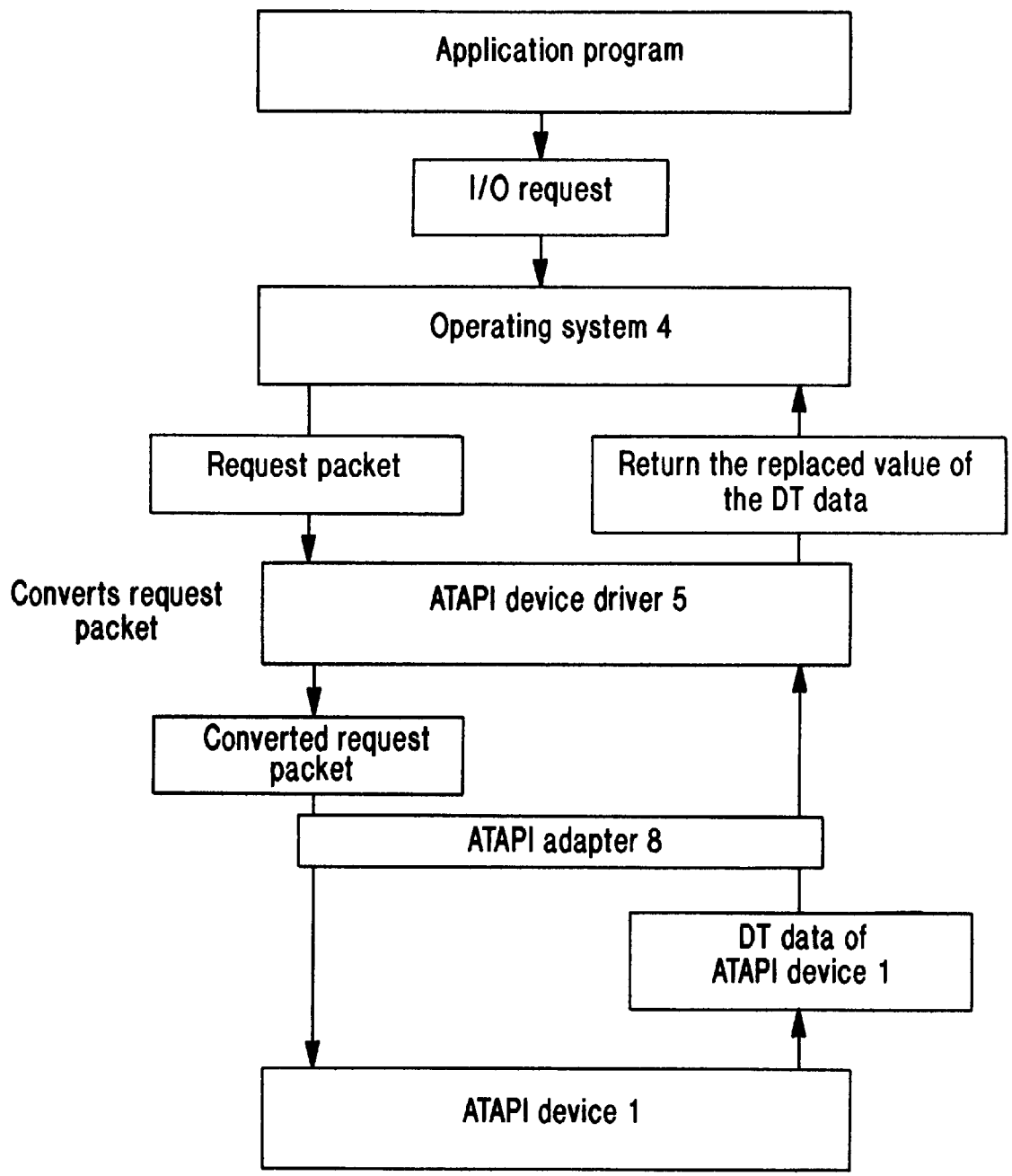
FIG. 3 is a flowchart diagram which is useful for illustrating operation of an exemplary embodiment of the present invention.

FIG. 1 is a block diagram of an embodiment of an automatic conversion device driver of DT data of the invention, and FIG. 2 is a flowchart showing the operation of the automatic conversion device driver.

As shown in FIG. 1, the automatic conversion device driver of DT data of the invention comprises:

(a) an ATAPI device 1, (b) a DT data storage region 2 in the ATAPI device 1, (c) a RAM 3 in a computer, (d) an OS 4 on the RAM 3, (e) an ATAPI device driver 5 disposed on the RAM 3 for controlling the ATAPI device 1, (f) a DT data storage region 6 capable of recognizing the OS 4, being disposed in the ATAPI device driver 5, (g) a DT data storage region 7 acquired from the ATAPI device 1, being disposed in the ATAPI device driver 5, (h) an ATAPI adapter 8 for making an access to the ATAPI device 1, and (i) a processor 9.

The processor 9

(a) is connected to the ATAPI device 1 through the ATAPI adapter 8, (b) responds to the I/O request from the application program under the OS 4, and (c) creates a request packet in the OS 4 for accessing the ATAPI device 1.

The ATAPI device driver 5

(a) converts the request packet from the OS 4, and (b) communicates with the ATAPI device 1.

The operation of the automatic conversion device driver of DT data having such configuration is shown in a flowchart in FIG. 2.

Step 1: When the computer is started, the OS 4 and ATAPI device driver 5 are incorporated into the RAM 3 in the computer.

Step 2: The ATAPI device driver 5 stores the DT data which can be recognized by the OS 4, in the DT data storage region 6.

Step 3: The ATAPI device driver 5 confirms that the ATAPI device 1 is connected on the system when the ATAPI device 1 reads the register in the DT data storage region 2 of the ATAPI device 1 through ATAPI adapter 8.

When connection of ATAPI device 1 and ATAPI device driver 5 is confirmed, the process advances to step 4.

If not connected, the process is interrupted and terminated.

Step 4: The OS 4 requests DT data to the ATAPI device 1 through the ATAPI device driver 5.

Step 5: The ATAPI device driver 5 issues a device command corresponding to the request of DT data from the OS 4, to the ATAPI device 1.

Step 6: The ATAPI device driver 5 acquires the data in the DT data storage region 2 of the ATAPI device 1, and stores in the DT data storage region 7.

Step 7: The ATAPI device driver 5 acquires the DT data from the DT data storage region 6 and DT data storage region 7, and DT data storage region 6 and DT data storage region 7 are comparer.

As a result of this comparison:

When both of these DT data are not matched, the process advances to step 8.

When both of these DT data are matched, the process skips to step 9.

Step 8: The ATAPI device driver 5 changes the setting of the DT data in the DT data storage region 7 so as to be recognized by the OS 4 by the DT data in the DT data storage region 6.

Step 9: The ATAPI device driver 5 returns the DT data of the DT data storage region 7 to the OS 4.

Thus, without changing directly the DT data in the device's own DT data storage region 2 possessed by the ATAPI device 1 itself, the setting is changed automatically so that the DT data of the DT data storage region 2 of the ATAPI device 1 not recognized by the OS 4 can be recognized by the OS 4.

INDUSTRIAL APPLICABILITY

Hitherto, the ATAPI device driver was not composed in the RAM. Therefore, when a certain system is connected with a device having a fixed DT data that cannot be recognized by its own OS, the system cannot recognize the DT data of the connected device.

Thus, according to the automatic conversion device driver of DT data of the invention, if the device's own DT data possessed by the ATAPI device itself cannot be recognized by the OS of the system to which it is connected, the DT data in the ATAPI device driver is changed in setting to the DT data which can be recognized by the OS. As a result, the OS of the system can recognize the DT data of the ATAPI device. Therefore, it is not necessary to design so that the device may have the DT data conforming to the DT data which can be recognized by the OS of the system, and the invention brings about an effect of connecting the device to the system easily.

What is claimed is:

1. An automatic conversion device driver of device type data for returning to an operating system of a system to which an ATAPI device is connected, characterized by:
    (a) acquiring device type data of the device from the ATAPI device,
    (b) if the operating system of said system cannot recognize said device type data,
    (c) changing the setting of the device type data stored in the device type data storage region of the ATAPI device driver, into device type data which can be recognized by the operating system stored in the device type data storage region which can be recognized by said operating system of said ATAPI device driver, and
    (d) returning the device type data changed in setting to the operating system of the system to which said ATAPI device is connected.

2. An automatic conversion device driver of device type data comprising:
    (a) an ATAPI device,
    (b) an ATAPI adapter connected to said ATAPI device, for making access to said ATAPI device,
    (c) a processor for creating a request packet for accessing said ATAPI device, in an operating system in response to the I/O request from an application program under the operating system,
    (d) an ATAPI device driver for communicating with said ATAPI device, by converting said request packet from said operating system, and
    (e) a main memory for storing said ATAPI device driver, operating system, and application program, further comprising:
    (f) means for storing device type data which can be recognized by said operating system,
    (g) means for storing device type data acquired from said ATAPI device,
    (h) means for comparing the device type data acquired from the means for storing the device type data which can be recognized by said operating system, and device type data acquired from the means for storing the device type data acquired from said ATAPI device,
    (i) means for converting the device type data acquired from the means for storing the device type data acquired from said ATAPI device, into device type data which can be recognized by said operating system, depending on the result obtained from the comparing means of said device type data, and
    (j) means for returning the device type data acquired from said converting means to said operating system.

* * * * *

UNITED STATES PATENT AND TRADEMARK OFFICE
CERTIFICATE OF CORRECTION

PATENT NO.     : 6,378,016 B1                                              Page 1 of 1
DATED          : April 23, 2002
INVENTOR(S)    : Seiji Noguchi It is certified that error appears in the above-identified patent and that said Letters Patent is hereby corrected as shown below:

<u>Title page,</u>
Item [57], ABSTRACT, insert the following abstract:

-- Without changing the setting of the existing device's own data, the device type data acquired from an ATAPI device and the device type data which can be recognized by the operating system are compared, and when the both device type data are not matched, the device type data acquired from the ATAPI device is converted into the device type data which can be recognized by the operating system. --

Signed and Sealed this

Twenty-first Day of January, 2003

JAMES E. ROGAN
*Director of the United States Patent and Trademark Office*